US007145727B2

(12) United States Patent
Hsieh

(10) Patent No.: US 7,145,727 B2
(45) Date of Patent: Dec. 5, 2006

(54) UNPOLARIZED BEAM SPLITTER HAVING POLARIZATION-INDEPENDENT PHASE DIFFERENCE WHEN USED AS AN INTERFEROMETER

(75) Inventor: Yung-Chieh Hsieh, San Jose, CA (US)

(73) Assignee: Optoplex Corporation, Fremont, CA (US)

( * ) Notice: Subject to any disclaimer, the term of this patent is extended or adjusted under 35 U.S.C. 154(b) by 0 days.

(21) Appl. No.: 10/796,512

(22) Filed: Mar. 8, 2004

(65) Prior Publication Data

US 2004/0263990 A1 Dec. 30, 2004

Related U.S. Application Data

(60) Provisional application No. 60/459,124, filed on Mar. 30, 2003, provisional application No. 60/456,356, filed on Mar. 21, 2003, provisional application No. 60/456,300, filed on Mar. 20, 2003, provisional application No. 60/456,295, filed on Mar. 20, 2003, provisional application No. 60/452,647, filed on Mar. 7, 2003.

(51) Int. Cl.
*G02B 27/10* (2006.01)

(52) U.S. Cl. .................................... 359/634; 359/618

(58) Field of Classification Search ............... 359/634, 359/618, 722, 589; 398/65, 152, 188, 82
See application file for complete search history.

(56) References Cited

U.S. PATENT DOCUMENTS

| | | | | |
|---|---|---|---|---|
| 4,431,258 | A * | 2/1984 | Fye | 398/86 |
| 4,627,688 | A * | 12/1986 | Kobayashi et al. | 359/634 |
| 5,400,179 | A * | 3/1995 | Ito | 359/588 |
| 5,717,523 | A * | 2/1998 | Ohashi | 359/588 |
| 5,912,762 | A * | 6/1999 | Li et al. | 359/352 |
| 2002/0012168 | A1* | 1/2002 | Li | 359/487 |

* cited by examiner

*Primary Examiner*—Ricky Mack
*Assistant Examiner*—M. Hasan
(74) *Attorney, Agent, or Firm*—John P. Wooldridge

(57) ABSTRACT

Beam splitter designs for interferometers provide a phase difference between the two resulting interference beams that are independent of the polarization status of the incident beam. The polarization independent phase coating is achieved by making the internal beam splitting coating of an unpolarized beam splitter to be symmetrical. A symmetrical coating will produce the phase matching condition, $\Psi s_R - \Psi s_{R'} = \Psi_{PR} - \Psi_{PR'} = 0$.

13 Claims, 2 Drawing Sheets

Figure 2: The Mach-Zehnder interferometer
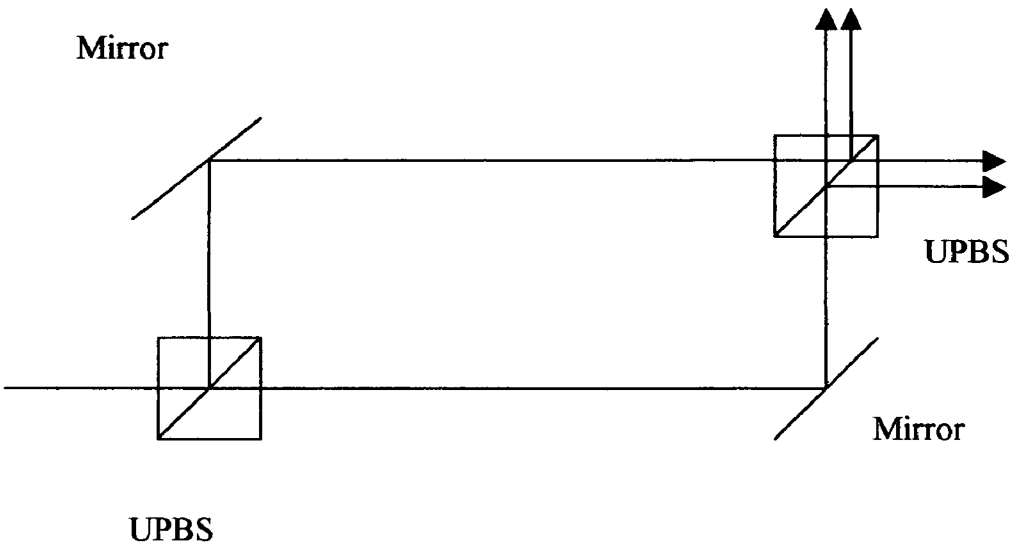

UNPOLARIZED BEAM SPLITTER HAVING POLARIZATION-INDEPENDENT PHASE DIFFERENCE WHEN USED AS AN INTERFEROMETER

This application claims priority to U.S. Provisional Patent Application Ser. No. 60/452,647, filed Mar. 7, 2003 titled: "Unpolarized Beam Splitter Of Polarization-Independent Phase Difference While Using As An Interferometer," incorporated herein by reference.

This application claims priority to U.S. Provisional Patent Application Ser. No. 60/456,295, filed Mar. 20, 2003 titled: "Thermal Tuning Optical Tuning Filter," incorporated herein by reference.

This application claims priority to U.S. Provisional Patent Application Ser. No. 60/456,300, filed Mar. 20, 2003 titled: "Hitless Optical Tunable Filter," incorporated herein by reference.

This application claims priority to U.S. Provisional Patent Application Ser. No. 60/456,356, filed Mar. 21, 2003 titled: "Sharp-Edge Step Phase Interferometer And Its Applications," incorporated herein by reference.

This application claims priority to U.S. Provisional Patent Application Ser. No. 60/459,124, filed Mar. 30, 2003 titled: "Optical Channel Analyzer Utilizing Tunable Filter Technology," incorporated herein by reference.

BACKGROUND OF THE INVENTION

1. Field of the Invention

The present invention relates to optical communication, and more specifically, it relates to a beam splitter designed such that the phase difference between the two interference beams is independent of the polarization status of the incident beam.

2. Description of Related Art

An un-polarized beam splitter (UBS) is popularly used in interferometers such as the Michelson (FIG. 1) and the Mach-Zehnder (FIG. 2). In the conventional Michelson interferometer of FIG. 1, the incident light 10 from the left-hand side of beam-splitter 12 is separated into two beams; part of the power is reflected (14) from the beam splitter and the rest of light is transmitted (16). After those two beams (16,14) are reflected from mirrors M1 and M2 respectively, beam 16 is reflected by, and beam 14 is transmitted through, beam-splitter 12 again. The interference takes place at both the bottom 18 and the left 20 of the beam-splitter. Constructive interference takes place when the optical path length difference (OPD) is an integer multiplication of wavelength. Since the total energy is conserved, the summation of optical power at the bottom arm and the left arm should be equal to the optical power delivered from the light source. In other words, when constructive interference occurs at the bottom arm, destructive interference occurs at the left arm.

It would be advantageous if a beam splitter for use in an interferometer were available such that the phase difference between the two interference beams were polarization independent

SUMMARY OF THE INVENTION

It is an object of the present invention to provide beam splitter designs where the phase difference between the two resulting interference beams in an interferometer are independent of the polarization status of the incident beam.

It is another object of the invention to provide optical interleaver designs that incorporate a beam splitters designed such that the phase difference between the two beams produced by the beam splitters is independent of the polarization status of the incident beam.

These and other objects will be apparent to those skilled in the art based on the disclosure herein.

A polarization independent phase coating is achieved by making the internal beam splitting coating of an unpolarized beam splitter to be symmetrical. A symmetric coating, for purposes of this application, is achieved when the coating structure looks the same to a beam propagating through it from either the front side or from rear side. For instance, in Equation (2.1) and (2,2), the phase difference of the two interference beams at the bottom arm does not depend on the polarization when the phase of the reflected beam incident with the front side is equal to that a beam incident with the rear side. A symmetrical coating will produce the phase matching condition, $\Psi s_R - \Psi s_{R'} = \Psi_{PR} - \Psi_{PR'} = 0$.

BRIEF DESCRIPTION OF THE DRAWINGS

The accompanying drawings, which are incorporated into and form a part of the disclosure, illustrate embodiments of the invention and, together with the description, serve to explain the principles of the invention.

FIG. 2 shows a Mach-Zehnder interferometer

DETAILED DESCRIPTION OF THE INVENTION

Figure 1:
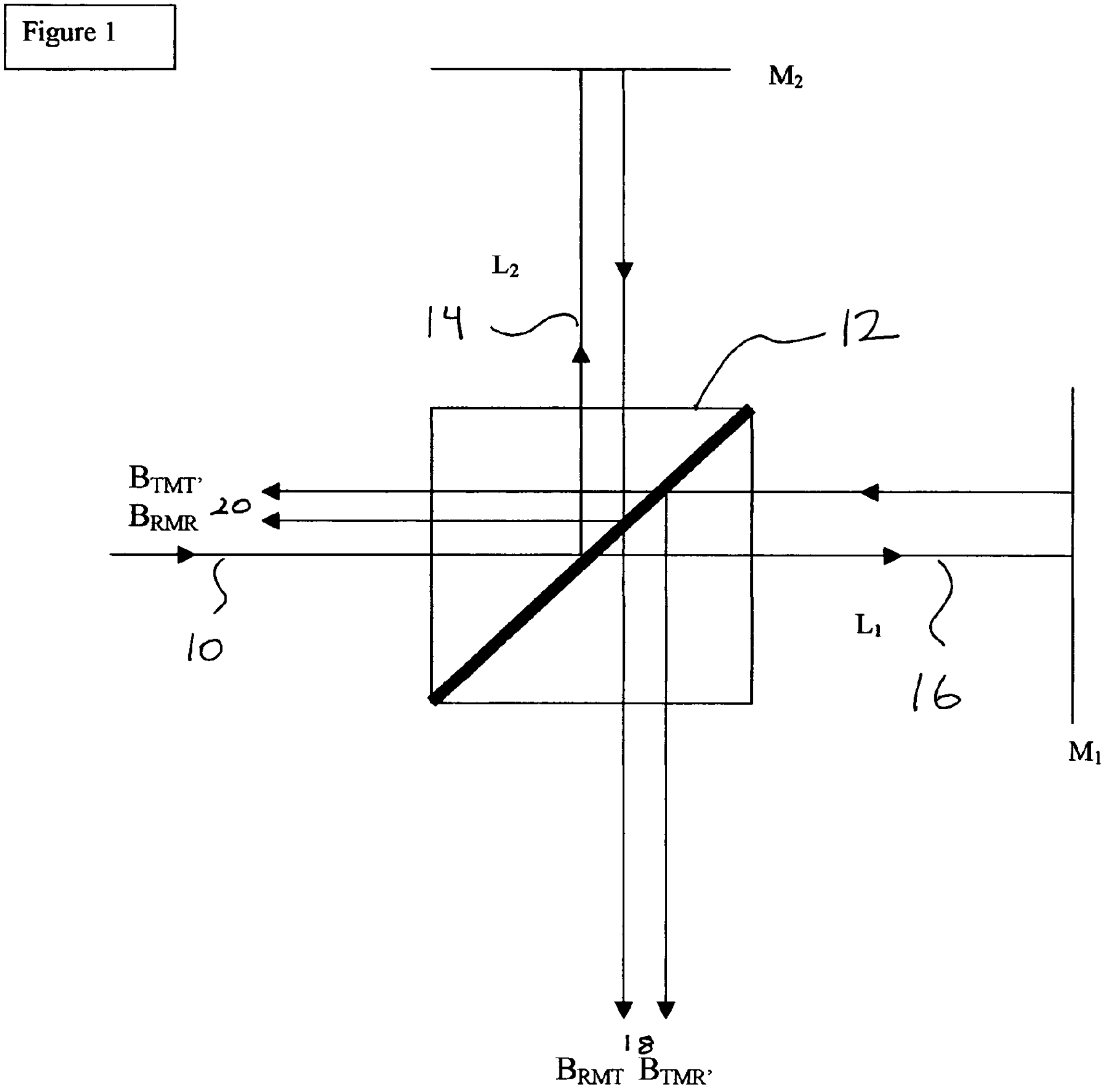
FIG. 1 shows a conventional Michelson interferometer.

This invention proposes a coating design for a beam splitter such that the phase difference between the two interference beams is polarization independent, when the beam splitter is used to separate and combine the light beam for an interferometer.

An explanation of the relevant formulas is provided in the exemplary embodiments discussed below.

Referring again to FIG. 1, the various phase functions are:

$\psi_{RMT}$: reflected by BS⇒reflected by mirror⇒transmit through BS.

$\psi_{TMR'}$: transmitted through BS⇒reflected by mirror⇒reflected by BS.

$\psi_{RMR}$: reflected by BS⇒reflected by mirror⇒reflected by BS.

$\psi_{TMT}$: transmitted by BS⇒reflected by mirror⇒transmit through BS.

$\psi_{ST}$: phase introduced by the BS for S-polarized light, transmitted beam with front side incidence.

$\psi_{ST'}$: phase introduced by the BS for S-polarized light, transmitted beam with rear side incidence.

$\psi_{SR}$: phase introduced by the BS for S-polarized light, reflected beam with front side incidence.

$\psi_{SR'}$: phase introduced by the BS for S-polarized light, reflected beam with rear side incidence.

$\psi_{PT}$: phase introduced by the BS for P-polarized light, transmitted beam with front side incidence.

$\psi_{PT'}$: phase introduced by the BS for P-polarized light, transmitted beam with rear side incidence.

$\psi_{PR}$: phase introduced by the BS for P-polarized light, reflected beam with front side incidence.

$\psi_{PR'}$: phase introduced by the BS for P-polarized light, reflected beam with rear side incidence.

$\psi_B = \psi_{TMR'} - \psi_{RMT}$ (phase difference in the bottom arm).

$\psi_L = \psi_{TMT'} - \psi_{RMR}$ (phase difference in the left arm).

Power is defined as:

$P_B$: optical power in the bottom arm.

$P_L$: optical power in the left arm.

Assuming that the incident polarization is S-polarized, the two electric fields at the bottom arm can be expressed as:

$$\vec{E}_{TMR'} = \frac{\hat{s}}{2}\exp(i\Psi_{TMR'}), \text{ and}$$

$$\vec{E}_{RMT} = \frac{\hat{s}}{2}\exp(i\Psi_{RMT}).$$

The total electric field at the bottom will be:

$$\begin{aligned}\vec{E} &= \vec{E}_{TMR'} + \vec{E}_{RMT} \\ &= \frac{\hat{s}}{2}[\exp(i\phi_{TMR'}) + \exp(i\phi_{RMT})] \\ &= \hat{s}\cos\left[\frac{\phi_{TMR'} - \phi_{RMT}}{2}\right]\exp\left[i\left(\frac{\phi_{TMR'} + \phi_{RMT}}{2}\right)\right] \\ &= \hat{s}\cos\left(\frac{\psi_B}{2}\right)\exp(i\psi(v)).\end{aligned} \quad \text{Equation (1)}$$

The first term in Equation (1) is the amplitude of the total electric field in the bottom arm and the second term is the corresponding phase. The amplitude is dependant upon the phase difference between the two interference beams, and the phase is the average of the two beams, where $$\psi_B = \phi_{TMR'} - \phi_{RMT}, \text{ and } \psi = \frac{\phi_{TMR'} + \phi_{RMT}}{2}.$$

Note that $$\psi_{TMR'} = 2\pi\left(\frac{v}{v_1}\right) + \psi_{ST} + \psi_{SR'}, \quad \text{Equation(2.1)}$$

$$\psi_{RMT} = 2\pi\left(\frac{v}{v_2}\right) + \psi_{SR} + \psi_{ST},$$

$$\psi_B^{(s)} \equiv \psi_{TMR'} - \psi_{RMT} = 2\pi\left(\frac{v}{v_0}\right) + (\psi_{SR'} - \psi_{SR}), \text{ and}$$

$$\psi^{(s)} \equiv \frac{\psi_{TMR'} + \psi_{RMT}}{2} = \pi\left(\frac{v}{v_1} + \frac{v}{v_2}\right) + \psi_{ST} + \left(\frac{\psi_{SR'} + \psi_{SR}}{2}\right).$$

When the incident polarization is P-polarized, $$\psi_B^{(p)} \equiv \psi_{TMR'} - \psi_{RMT} = 2\pi\left(\frac{v}{v_0}\right) + (\psi_{PR'} - \psi_{PR}), \text{ and} \quad \text{Equation(2.2)}$$

$$\psi^{(p)} \equiv \frac{\psi_{TMR'} - \psi_{RMT}}{2} = \pi\left(\frac{v}{v_1} + \frac{v}{v_2}\right) + \psi_{PT} + \left(\frac{\psi_{PR'} + \psi_{PR}}{2}\right).$$

Notice that in the derivation of Equation (2.1) and (2.2), the phases introduced from the AR-coated surface of the cube and the two reflection mirrors are neglected. Those phases do not have polarization dependence since the incident angles at those surfaces are dose to normal.

The polarization dependent feature of $\Psi_B$ and $\Psi$ in Equation (2.1) and (2.2) can result in certain problems. When the phase difference $\Psi_B$ has polarization dependence, the interference fringe will peak at a different frequency. Therefore, when the incident polarization includes both P and S, the fringe contrast will be degraded. Further, since the phase of the total electric field, $\Psi$, has polarization dependence, it can cause group velocity delay (GVD) between the P- and S-polarized light for a short pulse incidence from the left side of the cube, which is called polarization mode dispersion (PMD).

To make $\Psi_B$ polarization independent, one has to design the coating of the beam splitter (e.g., 12) such that $\Psi s_R - \Psi s_{R'} = \Psi_{PR} - \Psi_{PR'}$. One of the choices is to make the coating symmetric, which means the beam will see the same layer structure whether it is incident from the front side or the rear side. Such conditions will assure that $\Psi s_R = \Psi s_{R'}$ and $\Psi_{PR} = \Psi_{PR'}$.

With a symmetric coating on the beam splitter, in Equ. (2.1) and (2.2), $\Psi s_R - \Psi s_{R'} = \Psi_{PR} - \Psi_{PR'} = 0$. The optical power at the bottom arm is as follows.

$$P_B = \|\vec{E}\|^2 = \left\|\cos\left(\frac{\psi_B}{2}\right)\exp(i\psi(v))\right\|^2 = \cos^2\left(\frac{\pi v}{v_0}\right).$$

The optical power at the left arm, $$P_L = 1 - P_B = \sin^2\left(\frac{\pi v}{v_0}\right).$$

Both $P_B$ and $P_L$ are independent of the incident polarization.

The unpolarized beam splitter of the present invention can be used in an optical interleaver. Examples of optical interleavers in which the present invention may be used are provided in U.S. Pat. No. 6,587,204, titled "The Application Of A Step-Phase Interferometer In Optical Communication," issued Jul. 1, 2003, and incorporated herein by reference.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:

1. A unpolarized beam splitter (UBS) comprising an internal beam-splitting coating that is approximately symmetrical, wherein a beam of light will see about the same layer structure whether it is incident from a front side or a rear side of said coating, wherein said coating is designed to approximate the condition such that wherein $\Psi s_R - \Psi s_{R'} = \Psi_{PR} - \Psi_{PR'}$ wherein $\Psi_{PR}$ is the phase introduced by said UBS for S-polarized light reflected from said front side, wherein $\Psi s_{R'}$ is the phase introduced by said UBS for S-polarized light reflected from said rear side, wherein $\Psi_{PR}$ is the phase introduced by said UBS for P-polarized light reflected from said front side, and wherein $\Psi_{PR'}$ is the phase introduced by said UBS for P-polarized light reflected from said rear side.

2. The UBS of claim 1, wherein said UBS is operatively located in an optical interleaver and is therein configured to separate an incident beam of light into a first beam of light and a second beam of light.

3. The UBS of claim 2, wherein the phase difference between said first beam and said second beam is independent of the polarization status of said incident beam.

4. The UBS of claim 3, wherein said optical interleaver further comprises a reflector operatively positioned to reflect said first beam of light to produce a first reflected beam; and a non-linear phase generator (NLPG) operatively positioned to reflect said second beam of light to produce a second reflected beam, wherein said first reflected beam and said second reflected beam interfere with one another, wherein the frequency dependence of the phase difference between said first reflected beam and said second reflected beam has a step-like function.

5. The UBS of claim 1, wherein said UBS is operatively located in an interferometer and is therein configured to separate an incident beam of light into a first beam of light and a second beam of light.

6. The UBS of claim 5, wherein the phase difference between said first beam and said second beam is independent of the polarization status of said incident beam.

7. A unpolarized beam splitter (UBS) comprising an internal beam-splitting coating that is approximately symmetrical, wherein a beam of light will see about the same layer structure whether it is incident from a front side or a rear side of said coating, wherein said coating is designed such that $\Psi s_R - \Psi s_{R'} = \Psi_{PR} - \Psi_{PR'}$, wherein $\Psi s_R$ is the phase introduced by said UBS for S-polarized light reflected from said front side, wherein $\Psi s_{R'}$ is the phase introduced by said UBS for S-polarized light reflected from said rear side, wherein $\Psi_{PR}$ is the phase introduced by said (UBS) for P-polarized light reflected from said front side, and wherein $\Psi_{PR'}$ is the phase introduced by said UBS for P-polarized light reflected from said rear side.

8. The UBS of claim 7, wherein said UBS is operatively located in an optical interleaver and is therein configured to separate an incident beam of light into a first beam of light and a second beam of light.

9. The UBS of claim 8, wherein the phase difference between said first beam and said second beam is independent of the polarization status of said incident beam.

10. The UBS of claim 9, wherein said optical interleaver further comprises a reflector operatively positioned to reflect said first beam of light to produce a first reflected beam; and a non-linear phase generator (NLPG) operatively positioned to reflect said second beam of light to produce a second reflected beam, wherein said first reflected beam and said second reflected beam interfere with one another, wherein the frequency dependence of the phase difference between said first reflected beam and said second reflected beam has a step-like function.

11. The UBS of claim 7, wherein said UBS is operatively located in an interferometer and is therein configured to separate an incident beam of light into a first beam of light and a second beam of light.

12. The UBS of claim 11, wherein the phase difference between said first beam and said second beam is independent of the polarization status of said incident beam.

13. A method, comprising:

providing an unpolarized beamsplitter (UBS) comprising an internal beam-splitting coating that is designed to approximate the condition such that $\Psi s_R - \Psi s_{R'} = \Psi_{PR} - \Psi_{PR'}$, wherein a beam of light will see the about the same layer structure whether it is incident from a front side or a rear side of said coating, wherein $\Psi s_R$ is the phase introduced by said UBS for S-polarized light reflected from said front side, wherein $\Psi s_{R'}$ is the phase introduced by said UBS for S-polarized light reflected from said rear side, wherein $\Psi_{PR}$ is the phase introduced by said UBS for P-polarized light reflected from said front side, and wherein $\Psi_{PR'}$ is the phase introduced by said UBS for P-polarized light reflected from said rear side;

splitting an incident beam of light directed into said UBS into a first beam of light and a second beam of light; and combining said first beam of light and said second beam of light to produce an interference pattern, wherein the phase difference between said first beam of light and said second beam of light is independent of the polarization status of said incident beam of light.

* * * * *